United States Patent

Witt et al.

[11] Patent Number: 4,651,813
[45] Date of Patent: Mar. 24, 1987

[54] THERMOSTAT FOR THE SETTING OF A CONSTANT TEMPERATURE FOR A FLUID

[75] Inventors: Jörg-D. Witt, Bergheim; Peter Schmidt, Huckelhoven, both of Fed. Rep. of Germany

[73] Assignee: Kernforschungsanlage Julich Gesellschaft mit beschrankter Haftung, Fed. Rep. of Germany

[21] Appl. No.: 715,506

[22] Filed: Mar. 25, 1985

[30] Foreign Application Priority Data

Mar. 31, 1984 [DE] Fed. Rep. of Germany ....... 3412157

[51] Int. Cl.$^4$ .................... F25B 29/00; G05D 23/00
[52] U.S. Cl. ........................................ 165/30; 165/39; 165/65
[58] Field of Search .................... 165/30, 65, 26, 39

[56] References Cited

U.S. PATENT DOCUMENTS

| | | | |
|---|---|---|---|
| 3,329,202 | 7/1967 | Birman | 165/26 |
| 3,370,454 | 2/1968 | Flores | 165/108 |
| 3,612,165 | 10/1971 | Haynes | 165/26 |
| 3,834,617 | 9/1974 | Dyntar | 165/26 |
| 4,072,181 | 2/1978 | Kostura et al. | 165/30 |
| 4,117,881 | 10/1978 | Williams et al. | 165/30 |

Primary Examiner—William R. Cline
Assistant Examiner—John K. Ford
Attorney, Agent, or Firm—Scully, Scott, Murphy and Presser

[57] ABSTRACT

A process for the setting of a constant temperature for a fluid, and furthermore, to a thermostat for implementing the process. The constant temperature is set by the heating up of the fluid during its flow through a heat source. The fluid, prior to the setting of the constant temperature, is initially cooled down to a lower temperature, such that the temperature difference which is reached between the constant temperature and a lower temperature, is higher than the temperature-overshooting range of the cooling regulating circuit. These measures simplify the setting of the constant temperature inasmuch as only the heat source need be equipped with a high-performance regulator. Through the cooling section which is connected ahead of the heating element, there is maintained a minimum temperature differential. The temperature differential must be measured so high that the temperature-overshooting range of the cooling regulating circuit still remains below the constant temperature which is to be set by the heat source. It is to be understood, that the term temperature-overshooting range refers to the maximum deviation encountered relative to the value, which is transiently produced during a build-up sequence of the cooling regulating circuit, subsequent to a change in a disturbance variable. A thermostat for effectuating the process is equipped with a cooler and with a heating arrangement for the warming up of the fluid.

5 Claims, 2 Drawing Figures

FIG. 1
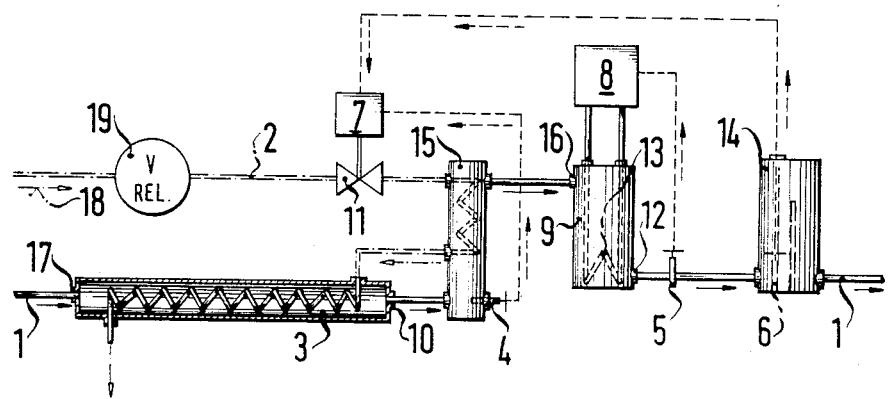
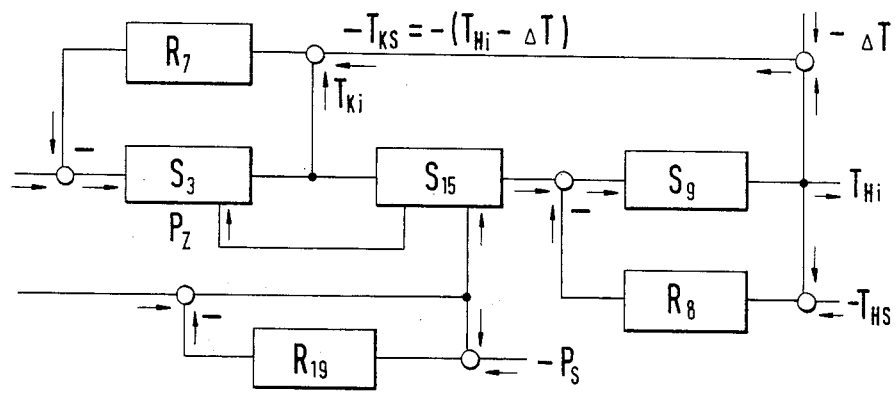
FIG. 2

THERMOSTAT FOR THE SETTING OF A CONSTANT TEMPERATURE FOR A FLUID

BACKGROUND OF THE INVENTION

1. Field of the Invention

The present invention relates to a process for the setting of a constant temperature for a fluid, and furthermore, relates to a thermostat for implementing the process. The constant temperature is set by the heating up of the fluid during its flow through a heat source.

An extremely exact temperature regulation is required for fluids with a low mass or, in effect, low flow velocity; for instance, for the determination of the output capacity of solar collectors. The fluids flow through the solar collectors and are, as a consequence, heated up. The solar collectors are heating units which belong to the low-temperature heating technology, wherein during the heating up in solar collectors, these provide for only relatively low temperature differences between the inlet and outlet temperature of the fluid. In order to determine the dissipation loss and the operating efficiency of solar collectors, it is necessary to provide for extremely exactly set inlet temperatures of the fluid which is to be heated up within the solar collector. Pursuant to German Industry Standard DIN 4757/4, the inlet temperature is permitted to maximally deviate by only about $\pm 0.1$ K from a pregiven rated temperature.

Consequently, the fluid is either withdrawn from a bath thermostat with a suitable fluid reservoir, or a heat exchanger is employed as thermostat, through which the required fluid quantity is set to the rated temperature by means of a control circuit.

2. Discussion of the Prior Art

In order to determine the operating efficiency of solar collectors, the fluid quantity which is heated up in the solar collector is conducted in a closed circuit on test stands. The solar collector is measured under differently intense and, upon occasion, fluctuating solar radiation; in essence, the fluid is heated up to a different extent within the solar collector. In such test stands, the thermostat, as a result, is not only adapted for the heating up of the fluid prior to its inlet into the solar collector, but also for effectuating a cooling to the pregiven rated temperature at the inlet of the solar collector. It is disadvantageous that the fluid, which is differently heated after passing through the test section, necessitates during its reconveyance in a closed circuit in thermostats, a differently intense heating up or cooling down in order to be heated or cooled to the rated temperature at the inlet of the solar collector. As a result, the thermostats possess an extremely complex setting arrangement in order to be able to maintain the prescribed maximum deviation of the inlet temperature of the fluid in the solar collector at about $\pm 0.1$ K.

SUMMARY OF THE INVENTION

Accordingly, it is an object of the present invention to provide a process for the setting of a constant temperature for a fluid at a low mass flow, which affords an extremely precise temperature regulation at low susceptibility to difficulties, and with only inexpensive economical requirements.

The foregoing object is achieved in accordance with the invention in that the fluid, prior to attaining the constant temperature, is initially cooled down to a lower temperature, such that the hereby produced temperature difference, which is reached between the constant temperature and a lower temperature, is higher than the temperature-overshooting range of the cooling regulating circuit. The term temperature-overshooting range refers to the maximum deviation in temperature above the desired lower temperature produced by the cooling regulating circuit. Accordingly, the temperature of the fluid exiting from the cooling regulating circuit, even with the maximum deviation above the desired lower temperature, is not as high as the constant temperature, such that the fluid must still be heated to attain the constant temperature. These measures simplify the setting of the constant temperature inasmuch as only the heat source need be equipped with a high performance regulator. Through the cooling section, which is connected ahead of the heating element, there is maintained a minimum temperature differential. The temperature differential must be measured so high that the temperature-overshooting range of the cooling regulating circuit still remains below the constant temperature which is to be set by the heat source. It is to be understood, that the term temperature-overshooting range refers to the maximum deviation encountered relative to the value which is transiently produced during a build-up sequence of the cooling regulating circuit, subsequent to a change in a disruptive variable.

A thermostat for effectuating the process is equipped with a cooler and with a heating arrangement for the warming up of the fluid. Serving as the cooler is a recuperator through which flows the fluid, which is a part of a cooling regulating circuit and which determines the outlet temperatures of the fluid at the cooler. Also the outlet temperature of the fluid at the heat arrangement can be determined through the use of a heating regulating circuit.

Proceeding from the utilization of a thermostat which is equipped in such a manner, it is a further feature of the invention that the cooler and heating arrangement are flowed through in sequence by the fluid, wherein the outlet temperature of the fluid at the cooler is set to a temperature which is below the constant temperature at the outlet of the heating arrangement. The difference between the set lower temperature at the cooler and the constant temperature at the heating arrangement is measured to be greater than the temperature-overshooting range of the cooling regulating circuit. With this construction of the thermostat it is possible to simply configure the cooling regulating circuit and to utilize a proportional action controller. Merely the heating arrangement needs to be provided with a precisely operating regulator, in particular with a high quality PID-regulator.

Further features and embodiments of the invention may be ascertained in providing the setting in the cooling regulating circuit of a rated temperature for the cooler, which is controlled in dependence upon the actual temperature of the fluid at the outlet of the heating arrangement. This facilitates a simple setting and correlation of the thermostat to variable rated temperatures which are prescribed for the fluid. Moreover, this construction of the thermostat allows a mechanical controller to be inserted into the cooling regulating circuit, and an electronic controller into the heat regulating circuit, without having to separately prescribe the rated values for both regulating circuits.

For effecting the stabilization of the cooling circulating flow, provision is made for connecting a heat exchanger to the outlet of the cooler after the measurement of the outlet temperature of the fluid which, on the one side, is flowed through by the cooling medium of the cooler prior to the entry thereof into the cooler, and on the other side, by the fluid which has been cooled in the cooler. In this manner, it is possible to reduce the temperature differences in the cooler between the introduced cooling medium and the exiting fluid.

For effecting the cooling of the fluid, the cooler also allows itself to be supplied with a cooling medium which is set to a certain inlet temperature. In that instance, the cooling medium is suitably withdrawn from a bath thermostat, whose temperature is set at the rated temperature which is prescribed for the cooling regulating circuit.

The heating arrangement suitably incorporates an inlet connection in its upper region for the fluid which is to be heated up, and the discharge therefor in the lower region. The fluid is thusly conducted in the heating arrangement in a direction opposite to the natural upward movement which is produced during heating. Thereby, the laminar flow encountered in the heating arrangement at a low mass flow, or at a low flow velocity, is counteracted and there is achieved a better through-mixing of the fluid which will improve the heat transfer and, in conjunction therewith, the regulation. In order to be able to achieve a further temperature equilibration, there is additionally connected a surge tank for the fluid to the outlet of the heating arrangement. The fluid can be withdrawn from the surge tank at a highly constant temperature.

BRIEF DESCRIPTION OF THE DRAWINGS

Reference may now be had to the following detailed description of an exemplary embodiment of the invention, taken in conjunction with the accompanying drawings; in which:

FIG. 1 schematically illustrates a thermostat with a cooler and a heating arrangement; and FIG. 2 illustrates a block circuit diagram showing the regulating technology employed for the thermostat pursuant to FIG. 1.

DETAILED DESCRIPTION

The drawing illustrates the construction of a thermostat and the regulation arrangement associated therewith, in a schematic representation. In FIG. 1 there are represented the flow and the direction of flow of a fluid 1 which is to be temperature-regulated in the thermostat, by means of the solid lines and the solid arrows. The flow and the direction of flow of a cooling medium 2 for a cooler 3 are illustrated by means of the dashed flow lines and the lighter arrows. Also represented are signal paths which extend from temperature sensors 4, 5, 6 and which lead to a P-regulator 7 (proportional action controller) of a cooling regulating circuit, and to a PID-regulator 8 (proportional-integral-differential controller) of a heating regulator circuit. The signal paths are identified by phantom lines and also by solid arrows.

The thermostat has a cooler 3 and heating arrangement 9 associated therewith, which are connected in sequence in the direction of the flow of fluid 1. For effecting the regulation of the outlet temperature of the fluid at the cooler outlet 10, the cooling regulating circuit includes, in addition to the cooler 3, the P-regulator 7, the temperature sensor 4, and a hydraulically-controlled valve 11, which adjusts the flow quantity of the cooling medium 2. The through-flow of the cooling medium 2 is thus regulated in dependence upon the actual temperature $T_{Ki}$ of the fluid at the cooler outlet 10 (the temperature $T_{Ki}$ is measured by the temperature sensor 4), as well as upon the actual temperature $T_{Hi}$ of the fluid at the outlet 12 of the heating arrangement 9. The temperature $T_{Hi}$ of the fluid is measured by the temperature sensors 5 and 6. In the exemplary embodiment, the temperature sensor 5 belongs to the heat regulating circuit, and the temperature sensor 6 to the cooling regulating circuit. From FIG. 1 there can be ascertained that the heating regulating circuit with the heating arrangement 9 commencing from the temperature sensor 5, acts through the PID-regulator 8 on a heating element 13 in the heating arrangement 9, while the signal of the temperature sensor 6 is connected to the P-regulator 7. The temperature sensor 5 is inserted at the inlet of a surge tank 14 which is connected to the outlet of the heating arrangement 9. The function of the heating and cooling regulating circuit is hereinbelow more closely detailed on the basis of FIG. 2 of the drawings.

In the fluid flow circuit, the cooler 3 as shown in the exemplary embodiment additionally has a heat exchanger 15 connected to the outlet thereof, through which flows the cooled fluid 1 between the cooler outlet 10 and the inlet 16 of the heating arrangement. In counterflow to the fluid, the cooling medium 2 passes through the heat exchanger 15 already prior to its entry into the cooler 3. Upon flowing through the heat exchanger 15, the cooling medium will warm up and thus reduces the temperature difference between the cooling medium and the fluid at the cooler outlet 10. Through this temperature correlation between the cooling medium and fluid there are avoided undesirable fluctuations of the cooling regulating circuit. The fluid is introduced to the cooler 3 at its inlet 17.

The cooling medium 2 is also regulated with regard to its pressure at the inlet connection 18. For this purpose, a pressure regulator 19 is located in the inlet connection 18 which, in the exemplary embodiment, serves to provide for pressure reduction.

The regulation of the thermostat illustrated in FIG. 1, can be ascertained from block circuit diagram of FIG. 2 relating to the control technology. In the block circuit diagram there are presently designated by the blocks S the regulating section, and by the blocks R the regulator. For the association of regulating sections S with the individual structural components of the thermostat there are presently inserted as indices within the blocks the symbols S or R, the reference numerals of the components shown in FIG. 1. Thus, $S_3$ designates the cooler regulating section, $S_{15}$ the section of the heat exchanger 15, $S_9$ the heat regulating section. The block $R_7$ represents the P-regulator 7, the block $R_8$ the PID-regulator 8, and the block $R_{19}$ the pressure regulator 19. Tapped off between the regulating section $S_3$ and $S_{15}$ is the temperature $T_{Ki}$ of the fluid by the temperature sensor 4, and downstream of the regulating section $S_9$ the temperature $T_{Hi}$ of the fluid at the outlet 12 of the heating arrangement 9. The temperature $T_{Hi}$ is measured by the temperature sensors 5 and 6. Supplied to the regulator $R_7$ of the cooling regulating circuit, besides the temperature $T_{Ki}$ and $T_{Hi}$ is a temperature differential $\Delta T$ which is maintained constant. This temperature differential $\Delta T$ is so determined, that the temperature $T_{Ki}$ of the fluid which is set by the cooling regulating circuit, even under consideration of the overshooting range of the P-regulator 7, can be constantly maintained below the temperature $T_{Hi}$ at the outlet 12 of the heating arrangement relative to the rated temperature $T_{HS}$ of the heat regulating circuit. The rated value for the cooling regulating circuit is obtained, as can be ascertained from FIG. 2, from the actual temperature $T_{Hi}$ of the fluid at the outlet 12 of the heating arrangement 9 reduced by the temperature differential $\Delta T$, so that as the rated temperature $T_{KS}$ for the cooling regulating circuit there is obtained the value: $T_{KS} = T_{Hi} - \Delta T$. The rated temperature $T_{KS}$ for the setting of the fluid temperature $T_{Ki}$ is, accordingly, dependent upon the desired outlet temperature of the fluid at the heating arrangement 9. This renders the manipulation of the thermostat easier at a change of the outlet temperature which is to be set for the fluid.

From the block circuit diagram pursuant to FIG. 2 there can also be ascertained that the PID-regulator 8 has supplied thereto the actual temperature $T_{Hi}$ of the fluid at the outlet 12 of the heating unit 9, as well as the rated temperature $T_{HS}$. The PID-regulator 8 regulates the desired temperature in such a manner that the fluid of the subsequently connected surge tank 13 can be withdrawn therefrom with a deviation from the rated temperature of $\pm 0.1$ K.

The pressure regulation of the cooling medium is effected separately. The pressure measuring locations which are necessary for the pressure regulation are not separately shown in FIG. 1. In the block circuit diagram there is also illustrated for the regulator $R_{19}$ the input of a rated pressure value $P_S$. The setting of the pressure for the cooling medium will also be effective on the cooling output in the heat exchanger 15 as well as in the cooler 3. On the sections $S_{15}$ and $S_3$, the pressure acts as a disruptive variable $P_Z$.

When the cooler 3 is supplied with cooling medium, whose inlet temperature can be regulated; for example, in a bath thermostat which tempers the cooling medium prior to its entry into the cooler, then the cooling regulating circuit can be correspondingly further simplified.

The inventive thermostat is preferably adapted for a test section for determining the thermal efficiency of solar collectors. The thermostat regulates the inlet temperature of a fluid therein, which is introduced as a heat carrier into the solar collectors. Through the thermostat which is described in the exemplary embodiment, there can be set at the outlet of the surge tank 14 temperatures in the range of between 20 and 100° C. with a degree of exactness of better than $\pm 0.1$ K. Thereby, after heating in the solar collector, the fluid is reconveyed in a closed circuit to the inlet of the cooler, and is cooled down in the cooler to a temperature which is below the outlet temperature at the heating arrangement. The temperature differential $\Delta T_S$ between the rated temperature $T_{HS}$ of the heat regulating circuit and the rated temperature $T_{KS}$ of the cooling regulating circuit is maintained at $\Delta T_S = 10$ K. As the actual temperature differential $\Delta T$; between the actual temperatures of the fluid at the outlet of the heating arrangement and at the cooler outlet, there will then set itself a value of between $\Delta T = 5$ to 10 K. The actual temperature difference is especially dependent upon the mass flow of the fluid and upon the temperature thereof. In the exemplary embodiment, mass flows were set within the range of between 60 and 150 kg/h and a corresponding flow velocity in conduits of 0.10 to 0.25 m/s.

What is claimed is:

1. In a thermostat for the setting of a constant temperature of a fluid with a low mass flow and a low flow velocity through heating of the fluid prior to the flow thereof through a heat source; a cooling regulating circuit means including a cooler having a cooling medium flowing therethrough for cooling the fluid to a given lower temperature before entering a heating arrangement and a temperature sensor means for measuring the temperature of the fluid at the cooler outlet; and a heat regulating circuit means including said heating arrangement for heating the fluid to a constant temperature; the improvement comprising: said cooler and said heating arrangement being connected in series in the direction of flow of the fluid with a heat exchanger interposed in the path of the fluid between the cooler and the heating arrangement, said heat exchanger connected to the cooler downstream of the temperature sensor means for measurement of the temperature of the fluid at the cooler outlet, said heat exchanger having flowing therethrough both said cooling medium of the cooler and the cooled fluid, wherein the cooling regulator circuit means controls the cooler to cool the fluid prior to its heating in the heating arrangement to a temperature below said constant temperature and maintain the temperature difference between the temperature of the fluid at the cooler outlet and the set constant temperature at the outlet of the heating arrangement greater than a maximum deviation in temperature above the given lower temperature produced by the cooling regulating circuit means.

2. Thermostat as claimed in claim 1, comprising means for prescribing a rated temperature to the cooling regulating circuit means, said temperature being dependent upon the actual temperature of the fluid at the outlet of the heating arrangement.

3. Thermostat as claimed in claim 1, comprising means for supplying the cooler with a cooling medium which is temperable to a rated temperature.

4. Thermostat as claimed in claim 1, wherein the heating arrangement includes an inlet for the fluid which is to be heated in the upper region thereof, and a discharge for the fluid in the lower region.

5. Thermostat as claimed in claim 1, comprising a surge tank connected to the outlet of the heating arrangement in the direction of flow of the fluid.

* * * * *